United States Patent Office 3,421,695
Patented Jan. 14, 1969

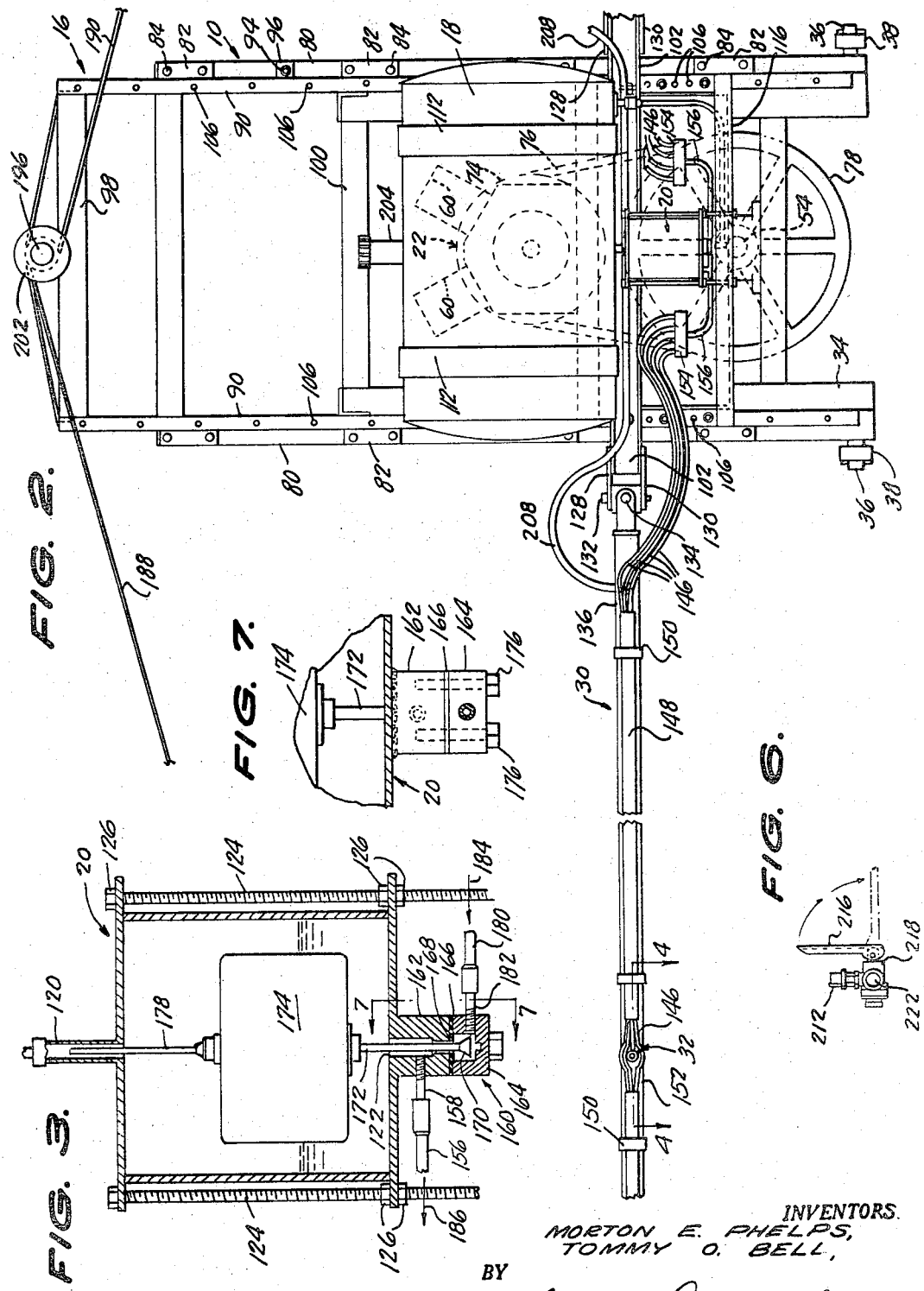

3,421,695
APPARATUS FOR SPRAYING MINUTE QUANTITIES OF A LIQUID DISPERSED IN AIR
Morton E. Phelps, Little Rock, Ark., and Tommy O. Bell, Hallsville, Tex., assignors to The Sifon Corporation, Hallsville, Tex., a corporation of Texas
Filed Dec. 2, 1966, Ser. No. 598,719
U.S. Cl. 239—164       13 Claims
Int. Cl. B05b 1/20

ABSTRACT OF THE DISCLOSURE

A spray apparatus having siphon-type nozzles with central bores for passage of compressed air and relatively large lateral inlet apertures for liquid, the liquid being supplied at a constant pressure which is negative relative to the air pressure, so that very small amounts of liquid are sprayed from the nozzles. Preferably, a plurality of nozzles are mounted on an adjustable boom and the liquid supply means is fixed to the boom to move therewith. The liquid supply means may include a tank having a float to maintain a constant head of liquid, the boom being disposed at, or above, the level of the liquid to create a negative pressure of the liquid with respect to the air in the nozzles, so that upon cut-off of the air, the flow of liquid to the nozzles is also immediately cut off. Variable pressure compressed air to the nozzles is valve controlled in a relief line to the atmosphere to change the rate of spray. An additional control is obtained by varying the height of the liquid supply tank.

Conventional art

Conventional spraying equipment is unsuitable for application of highly concentrated poisonous insecticides, such as Malathion LVC, which requires only four to twelve liquid ounces per acre. Most of the present ground applicators will not meter down to a small enough output to permit the use of the pure chemical and thus, the material must be diluted. This prevents the use of small tanks and long hours of operation without stopping for refill. An additional disadvantage of atomizing nozzle sprayers of conventional type is that the operator is positioned near the nozzle and near the regulators and valve controls where he is exposed to the poison.

While there are conventional spray nozzles theoretically capable of spraying the poison in requisite low dosage quantity, the orifices are so small that they soon become clogged, even when screens are employed. Ground applicators utilizing mist blowers are possible of use, but these provide uneven coverage, more horsepower is required to move the air and pump the liquid, and drift of the poisonous material may be excessive due to the large volume of air being set in motion.

Summary and objects of the invention

It is a primary object of the present invention to provide spraying equipment which obviates the disadvantages, above described, of conventional spraying equipment, while permitting the continuous application over long periods of very small quantities of concentrated liquids.

An important object of the present invention is to provide spray equipment utilizing siphon nozzles having bore passages for a compressed gas and relatively large, liquid inlet orifices not subject to clogging, but which, nevertheless, dispense the liquid in small amounts because of constant pressure of the liquid which is lower than the gas.

It is another object of the invention to provide spray apparatus, having the above described characteristics, in which there is no stoppage of flow of liquid caused by clogging of the inlet orifices and no excess flow of the liquid insecticides.

Still another object of the invention is to provide a spray apparatus, having the above described characteristics, whereby the spray nozzles may be varied in disposition above the ground without varying the spray and the proportion of liquid carried by the air in the spray.

A further object of the invention is to provide spray apparatus, having the above described characteristics, in which the means for supplying the liquid at constant pressure and the spray nozzles are mounted upon the same member for vertical adjustment together, so that raising and lowering of the nozzles will not affect the rate of spraying of the liquid.

A still further object of the invention is to provide spray apparatus, having the above described characteristics, in which means is provided for supplying the nozzles with compressed air, said means having an air pressure relief line with valve control means located close to an operator on a vehicle to which the apparatus is attached, said line containing no liquid and being spaced from the nozzles and the liquid pressure supply means, whereby to reduce the hazard to the operator when spraying poisonous insecticides in concentrated form.

Yet a further object of the invention is to provide a spray apparatus, having the above described characteristics in which control of the amount of concentrated liquid being sprayed is by regulation of a single air pressure relief valve, a second relief valve being provided for quickly turning on and shutting off the spray.

The novel features that are considered characteristic of the invention are set forth with particularly in the appended claims. The invention, itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

FIG. 1 is a side elevation of a spray apparatus according to the invention, attached to the rear of a tractor, only part of which is shown;

FIG. 2 is a fragmentary rear elevation of the apparatus alone;

FIG. 3 is a sectional view of a portion of the apparatus taken on line 3—3 of FIG. 1, and looking in the direction of the arrows;

FIG. 4 is a plan view of a segment of the nozzle supporting boom taken on line 4—4 of FIG. 2, looking in the direction of the arrows;

FIG. 5 is a fragmentary sectional view taken on line 5—5 of FIG. 1, and looking in the direction of the arrows;

FIG. 6 is a front elevation of a portion of the air pressure relief line taken on line 6—6 of FIG. 1, and looking in the direction of the arrows; and FIG. 7 is an elevational view of the lower portion of the constant level liquid tank taken on line 7—7 of FIG. 3, and looking in the direction of the arrows.

General structure

Referring now more particularly to the drawings, FIG. 1 illustrates a preferred embodiment of the invention as comprising a main frame 10 secured at the rear of a tractor, or other suitable wheeled vehicle, of which only the wheel 12 and a portion of the power transmission take-off 14 are shown. To the main frame is adjustably attached, for relative vertical movements, a secondary frame 16 carrying a liquid reservoir 18 and a constant pressure liquid supply tank 20. An air compressor 22, an air surge tank 24, and an air pressure control line 26 are mounted on the primary frame 10. Mounted on the secondary frame, and vertically adjustable therewith, is a horizontally disposed boom 30, only portions of which are shown, said boom being adaped to mount a plurality of nozzles 32 one only of which is shown in FIG. 4, said boom being hollow and adapted to convey compressed air from the surge tank 24 to each of the nozzles. It will be apparent that adjustment upwardly of the primary frame 10 will carry all of the above described parts of the apparatus upwardly together, while relative adjustment upwardly of the secondary frame 16 with respect to the primary frame will adjustably lift the liquid reservoir 18, the liquid constant pressure tank 20, the boom 30 and the nozzles 32 together. In addition, the liquid reservoir, the liquid pressure tank, the boom, the air compressor, and the air surge tank may be individually adjusted vertically with respect to each other, in a manner which will be more clearly explained hereinafter.

*Primary frame and carried components*

The primary frame 10 may be formed in any suitable manner, the illustrated embodiment being shown as comprising a box-like structure formed by angle beams at the edges and open in all directions. Two forward and vertically disposed angle bars 34, forming part of the frame, are pivoted at 36 near their bottoms to a pair of levers 38. A third lever 40, completing a conventional three point hitch is pivoted to bracket 42 supported at the center of a cross-bracing angle iron 44 fixed to the frame members 34. Swinging of the three levers 38, 40 by any suitable means will thus elevate or lower the primary frame 10 along a vertical plane to a desired position. The levers may be locked in a conventional manner to hold the primary frame at said elevation.

A power take-off axle 46 on the tractor transmission 14 is connected through a pair of universal joints 48, 50 and connecting transmission rod 52 to a driven shaft 54. This shaft is journaled in a pair of bearings 56 supported on cross-bracing angle irons 58, 60 at the front and rear of the primary frame. The compressor 22 may be conventional, and is shown as having two cylinders 60 but may be of any other suitable design, and is bolted to a floor member 62 at 64, said floor member being adjustably supported on a pair of threaded rods 66 supported from the upper angle bars 68 at each side of the primary frame. By loosening and tightening the nuts 70, the elevation of the floor member may be adjusted to any desired height. The input shaft 72 of the compressor carries a double pulley 74 over which is trained a pair of belts 76 whose lower ends are trained over grooved wheel 78 secured to the driven axle 54. Accordingly, the take-off shaft 46, coupling shaft 52, axle 54, and the described wheel and pulleys provide a power train from the tractor to the compressor which is operable at varying adjusted elevations of the primary frame 10.

The rearwardly disposed vertical frame members 80 of the primary frame each has vertically spaced guide plates 82 atached thereto by bolts 84 and spacer blocks 86 so as to form a guide groove in which is fitted one flange 88 of the U-shaped angle bar 90 forming one vertical side of the secondary frame 16. The secondary frame is thus free to slide within the described guide groove, and may be clamped in any desired vertical position by manipulation of the wheel 92 secured to a bolt 94 which is threaded in an opening in one of the members 80 and in a clamping plate 96. Release of the bolt 94 frees the secondary frame for vertical adjustment by sliding movement, as previously described. Such movement is accomplished manually with the illustrated apparatus, but if desired, a winch, or other power means, can be mounted on the upper portion of the primary frame for lifting or lowering the secondary frame.

*Secondary frame and carried components*

The secondary frame is planar in shape, rather than box-like, and is completed by upper and lower cross channel members 98, 100 as best seen in FIG. 2. A boom carying horizontally disposed, U-shaped channel 102 is clamped to the secondary frame by bolts 104, a plurality of vertically spaced openings 106 being provided in the outer flanges of members 90 through which said bolts may be applied so as to change the height of the boom channel 102. This member protrudes beyond the sides of the secondary frame and a pair of boom sections are secured thereto, one on each side, as will be later explained.

The vertically spaced apertures 106 are disposed along the complete lengths of frame members 30, the spacing being varied if desired, so as to accommodate bolts 108 to support bracket plates 110 having cylindrical rear flanges to which are clamped straps 112 securing the liquid reservoir 18. Obviously, with this structure the reservoir may be clamped to the secondary frame at any desired elevation. Similarly, the apertures 106 receive clamping bolts 114 for the cradle 116 which supports the constant pressure tank 20. By movement of the clamping bolts 114 to different apertures 106, the cradle 116 may be elevated, or lowered.

The constant pressure tank 20, as best seen in FIG. 3, comprises a completely enclosed vessel except for the vent 120 in the top plate and the discharge opening 122 in the bottom plate. Vent 120 is connected to a rigid discharge pipe 121 extending upwardly and curved rearwardly, see FIG. 1. Said top and bottom plates protrude beyond the sidewalls of the tank and are apertured to receive four threaded bolts 124 whose lower ends are secured to the bottom wall of the cradle 116. Positioning and locking nuts 126, upon release, enable the tank 20 to be moved upwardly, or downwardly, on the bolts and to be re-clamped at any desired elevation. Once clamped to the frame 16, the liquid reservoir 18 and the tank 20 together with the supporting bar 102 for the boom are movable with the secondary frame to any desired elevation. During adjusting movements the relative vertical disposition of the boom, the constant pressure tank, and the liquid reservoid remains fixed. However, it is apparent from the above description that each of these three components may be individually adjusted on the secondary frame at any desired location with respect to the other components.

*The boom and nozzles*

The boom 30 is attached to each end of the U-shaped beam 102 by means of upper and lower welded plates 128, 130, respectively, carrying a universal joint having a vertical pivot 132 and a horizontal pivot 134. The vertical pivot permits horizontal rotation of the boom, while the horizontal pivot permits vertical movements of the boom connected thereto. The boom section 136 is hollow and closed at each end to form a sealed conduit in its interior for compressed air. A plurality of siphon nozzles 32 are secured to the boom section 136 and to other similar sections, not shown, by a clamp member 138, FIG. 4, which includes a central threaded conduit to which the nozzle, itself, is secured. The conduit 140 at its inner end has a piercing member which penetrates the boom for entry of compressed air to the nozzle through the conduit. The nozzle 32 is pivotally supported on the clamping conduit 140 at 142. Any conventional siphon nozzle may be used. The one illustrated has a central bore through which compressed air passes from the hollow boom to the spray discharge end, said bore having a relatively large, liquid inlet aperture in which the nipple 144 is threaded and to which a flexible conduit 146 carrying the liquid to be sprayed is connected by the coupling 148. A flexible conduit 146 is provided for each of the nozzles, four being illustrated in FIG. 4. Desirably, these conduits are carried along the boom by means of an enveloping tube 148, which is tied to the boom by straps 150, an opening 152 being provided at each nozzle to accommodate the nozzle position. As best seen in FIG. 2, the flexible liquid pipes 146 at both sides of the boom are coupled at their free ends to a pair of manifolds 154, each of which is connected by a rigid pipe 156 to the outlet nipple 158 at the bottom of the constant pressure tank 20.

The boom is completed by pivotally securing at least one additional and substantially identical boom section 136 to the outer end of each of the boom section 136, partially shown in FIG. 2, in such a manner that the outer sections may be unclamped and swung to overlie the inner sections. Each of the added outer sections is adapted to receive a pair or more of nozzles 32. To the outer end of each of the outer sections a pair of support guy wires 188, 190 are attached and directed upwardly and outwardly to form a V-support for the boom. The upper ends of said guy wires of one pair are trained over a pair of pulleys 192, 194 fixed to a shaft 196 which is rotatable in a tube 198 supported transversely across the upper frame member 98, see FIGS. 1 and 2. A similar pair of pulleys 200, 202 spaced outwardly on the shaft 196 is provided for the second pair of guy wires 188, 190, which supports the opposite end of the boom. The shaft 196 may be turned by the crank 204 to elevate the ends of the boom when the tractor passes from one field to another. Desirably, the construction and arrangement are such that elevation is accomplished after the outer boom sections are folded over the inner boom sections, as by fastening the pairs of guy wires to the ends of the inner boom sections, so that both the inner and outer boom sections are elevated together. When the boom is in its lowered, horizontal, out-stretched condition, the support of the guy wires is such that the boom sections are free to swing both horizontally and vertically should the boom strike an obstruction.

The constant pressure tank

As best seen in FIG. 3, an outlet fitting 160 is formed by upper and lower tubular sections 162, 164, the upper section being welded to the bottom plate of the tank 20. A gasket 166 separates the sections and is apertured at 168 to form a restricted seat to receive the valve 170 at the bottom of a rod 172 secured at its top to a float 174 disposed within the tank. The rod 172 rides vertically with the float, and guides the float by reason of its loose entrainment in the bore of the fitting 160. A pair of bolts 176 secure the nipple parts together. The upper surface of the float is provided with a projecting rod 178, aligned with rod 172, and riding in the vertical vent tube 120 for guidance. It will be apparent from observation of FIG. 3, that liquid entering below the valve 170 through flexible conduit 180 and nipple 182 from the reservoir 18 in the direction of the arrow 184 will rise through the fitting 160 into the tank 20 until the float 174 rises to a pre-selected level, at which point the valve 170 will engage seat 168 and prevent further entry until some of the liquid is discharged through the pipe 156 in the direction of the arrow 186 to the two manifolds 154 supplying the nozzles. As liquid is delivered from the nozzles, the level in the tank will drop, opening the float valve 170 to permit entry of more liquid from the reservoir until the selected level is reached, at which time the float valve will again close. Thus, a constant head of liquid to be sprayed is maintained by the float 174 in the tank 20, and this head, it will be noted, is of relatively small height resulting in a low constant pressure at the nozzles. In addition, the level of the constant pressure tank, as noted from FIG. 2, will usually be selected to be below the level of the boom 30 and the nozzles 32. In other words, a negative liquid pressure with respect to air pressure in the nozzles is maintained by the pressure tank 20, and its disposition below the nozzles enables liquid in the flexible tubes 146 to drain back into or toward the tank 20 and away from the nozzles the moment compressed air, causing a suction or siphoning effect in the nozzles, is cut off. Thus, no undesired spraying or leakage of liquid can occur at the nozzles once the compressed air is turned off.

*The reservoir and insecticide*

The reservoir 18 is filled through inlet tube 205 and stores a suitable quantity of a very concentrated, liquid insecticide, preferably one such as Malathion LVC made and sold by the American Cyanamid Company of Princeton, N.J. This insecticide is intended to be sprayed, on cotton plants, to control the Culex mosquito, in very minute amounts ranging from 4–12 liquid ounces per acre. Of course, many other insecticides may be used, some of which need not be sprayed in as small proportion as the Malathion, for example, toxiphene—DDT, manufactured by the Hercules Powder Company of Wilmington, Del. Still other examples of insecticides which may be used and which are conventionally known are Sevin, Dylox, Dibrom, Dieldrin, Methyl parathion and Guthion.

*Compressed air control and operation of the apparatus*

To control the rate of spray of the liquid insecticide, the apparatus includes the following compressed air circuit. Air under pressure is led from the compressor 22 through conduits 206 in the air surge chamber 24. From the air surge chamber, conduits 208 lead to the hollow boom 30 being connected to each of the inner boot sections at nipples (not shown) near the inner ends of said sections. The folding outer sections 136 of the boom are similarly fed by air through flexible conduits, (not shown), connecting the adjacent ends of the inner and outer boom sections. A T-joint 210 at the top of the surge chamber connects to a rigid air release line, or pipe, whose free end is disposed at the rear of the tractor and close enough to the operator's position to enable him to reach the controls disposed at said free end. The control line 26 is provided with a pressure gauge 212 for reading the pressure in the line which pressure is the same in the hollow boom sections. Near the gauge is disposed a fitting 214 including a manually operable handle 216, FIG. 6, movable between the full line position shown and the broken line position to close and open a valve in said fitting, which, when open, exhausts the air completely through an aperture at the rear of the fitting and at the right side of FIG. 6. Beyond fitting 214 is a second fitting 218 including a valve controlled by the manually operable wheel 220. The latter valve is capable of controlling the exhaust of the air through the fitting open end 222, moving from a position which completely closes the line 26 to any desired degree so as to completely open the line 26. Thus, when the handle 216 is in its vertical, FIG. 6, position, closing the first valve, the wheel 220 may be turned to obtain any desired air pressure in the boom and nozzles as read on the gauge 212. Since the amount of the insecticide sprayed depends upon the air pressure, the size of the liquid inlet orifices in the nozzles being fixed for given nozzles, and the height of the constant pressure tank 20 having previously been set, the operator may, by controlling the handwheel 220, vary the air pressure to spray any desired proportion of the insecticide. If the pipe 26 is sufficiently large, the handwheel can be set to a position in which almost all of the compressed air is exhausted to atmosphere and the pressure at the nozzles is very, very small, reducing the rate of spray of the insecticide liquid to a very minute amount. When it is desired to cut off the spray, the handle 216 is thrown to its horizontal position, completely exhausting the the compressed air from pipe 26 and reducing the pressure in the booms and at the nozzles to zero. At this time the spray is immediately cut off, and all liquid in the nozzle nipples 144 drains by gravity back toward the underside of the constant pressure tank 20 and away from the nozzles, so that all danger of dripping poisonous liquid from the nozzles, when the spray is cut off, is completely eliminated.

The operation of the spray apparatus, having been partially described in the preceding paragraph, will now be obvious. Having adjusted the height of constant pressure tank 20 so that its float control level is at any desired elevation below the boom 30 supported in the bar 102, the amount of liquid drawn into the nozzles per unit of time is adjusted by selecting the pressure of the compressed air at gauge 212 to suit the condition of the plants to be sprayed. The apparatus may be adjusted to overlie the plants by shifting the levers 38, 40 of the three-point hitch to elevate the frame 10 and thus the entire apparatus. If necessary, the frame 16 may be elevated or lowered with respect to frame 10 by releasing the clamp 94, 96 and manually raising, or lowering frame 16 before re-clamping. The vehicle may then be driven in a skip row between the plants with the boom extending on both sides to position the nozzles over four to eight rows of plants. At the end of the field the spray is quickly turned off by manipulation of the handle 216, while the vehicle is turned to enter the next skip row. While the pipe 26 is exhausting all of the compressed air, none of the liquid can drip from the nozzles, and since the pipe 26 is the only part of the apparatus close to the operator, said pipe having compressed air only, danger to the operator from the poison liquid is avoided. In moving from field-to-field, or across roads, and the like, the crank 204 may be operated, after folding the boom, to lift the boom and spray nozzles vertically and render the apparatus compact for travel.

It should be noted that when the air control line 26 is of sufficient size, enough air can be permitted to escape to reduce the pressure at the nozzles to zero or less. A reverse, or negative, pressure in the air supply lines helps to empty the booms of air and this makes for a quicker cut-off of the spray.

It should be further noted that the amount of flow of the liquid portion is controlled by the amount of air pressure supplied to the nozzles, and by the height difference between the nozzles and the constant level tank. Thus, when the constant level tank is lowered away from the boom, the flow of material is reduced, just as when the air pressure is reduced. This is a function of the lifting power, or siphon effect, of the nozzles. Thus, greater air pressure will produce greater suction and more liquid flow, and a shorter lift in the lines 146 connecting the constant level tank to the nozzles will reduce the amount of suction required to cause flow of the material and, thereby, also increase the flow.

While the apparatus has been described for mounting upon a tractor-like vehicle, it will be obvious that other types of vehicles may be used, and, in fact, it may be mounted on vehicles not having wheels, such as helicopters, planes, and other types of aircraft. The outer frame 16 has been described as being manually adjustable to various levels with respect to the frame 10, but it is obvious that mechanical means, winches, and the like, may be utilized for accomplishing this adjustment.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. An apparatus to be attached to a vehicle for spraying minute quantities of a liquid dispersed in air, comprising a siphon nozzle having a bore for passage of compressed air and a lateral inlet aperture for liquid to be sprayed, means for supplying air under pressure to said nozzle bore, and means for supplying liquid under a constant pressure lower than the pressure of said air to the liquid inlet aperture, said means for supplying liquid under constant pressure comprising a liquid reservoir and a liquid tank, a first conduit connecting said reservoir and tank for gravity feed to the latter, means for maintaining a constant head of liquid in said tank, means for supporting said nozzle at a fixed elevation with respect to said tank, and a second conduit connecting the tank to the inlet aperture of the nozzle for feed of liquid to the nozzle.

2. An apparatus according to claim 1, wherein said means for supplying air under pressure includes a compressor, a pressure control line connected at its inner end to the output of said compressor and terminating at its outer end in a first valve for controlling the rate of escape of compressed air to the atmosphere, and a by-pass in said control line including a second valve operable in two positions to close the by-pass and to open the by-pass for bleeding all of the compressed air to atmosphere, whereby to shut off the supply of compressed air to said nozzle.

3. An apparatus according to claim 2, wherein said means for supplying air under pressure includes a surge control tank connected to the output of said compressor, said pressure control line being directed away from said nozzle and said means for supplying liquid so that its outer end and the first and second valves may be conveniently disposed near an operator at a safe distance from the nozzle and liquid supply means.

4. An apparatus according to claim 1, wherein said means for supporting the nozzle holds the nozzle at an elevation no lower than the level of liquid in said tank so as to produce a liquid pressure at the nozzle which is less than the pressure of air supplied thereto.

5. An apparatus according to claim 1, wherein said tank is vented to atmosphere.

6. An apparatus according to claim 1, wherein said means for supporting said nozzle comprises a boom to which the nozzle is secured, a first frame to be secured to a vehicle, a second frame secured to said first frame and capable of vertical adjustment with respect thereto, and means securing said boom and tank to said second frame for simultaneous movements when the latter is adjusted.

7. An apparatus according to claim 6, wherein said reservoir is adjustably affixed to said second frame above said tank.

8. An apparatus according to claim 6, wherein said boom is vertically adjustable on said second frame for variation of the vertical spacing between the nozzle and the tank.

9. An apparatus according to claim 6, wherein said first frame carries upper and lower suspension means for attachment to a vehicle and including horizontal pivots enabling vertical adjustment of the first frame with respect to the vehicle.

10. An apparatus according to claim 6, wherein said means for supplying air under pressure comprises a compressor mounted on said first frame.

11. An apparatus according to claim 6, wherein a plurality of said siphon nozzles are mounted on said boom, said boom being hollow and serving as a portion of said first conduit for feeding air to the nozzles, and a plurality of said second conduits being provided and mounted along and secured to the boom.

12. An apparatus according to claim 9, wherein said means for supplying air under pressure includes a compressor mounted on said first frame.

13. An apparatus according to claim 1, wherein said means for maintaining a constant head of liquid in the tank comprises a valve in said first conduit and a float in said tank connected to said valve for shutting off entry of liquid to the tank.

(References on following page)

References Cited

UNITED STATES PATENTS

| | | | |
|---|---|---|---|
| 1,437,331 | 11/1922 | Alexander | 239—434 |
| 1,629,032 | 5/1927 | Goodridge | 239—124 |
| 2,586,256 | 2/1952 | Quarles | 239—150 |
| 2,759,762 | 8/1956 | Kostka et al. | 239—434 |
| 3,219,275 | 11/1965 | Green | 239—172 |

EVERETT W. KIRBY, *Primary Examiner.*

U.S. Cl. X.R.

239—127, 356